United States Patent [19]
Asaka et al.

[11] 3,850,652
[45] Nov. 26, 1974

[54] MULTI-PURPOSE MEMBRANE

[75] Inventors: Kunitami Asaka, Tokyo; Masanori Ishihara, Hiratsuka, both of Japan

[73] Assignee: Anne Company Ltd., Tokyo, Japan

[22] Filed: June 21, 1973

[21] Appl. No.: 372,004

Related U.S. Application Data

[63] Continuation of Ser. No. 98,207, Dec. 14, 1970, abandoned.

[52] U.S. Cl. .......................... 106/197 R, 260/231 A
[51] Int. Cl. ............................................. C08b 21/24
[58] Field of Search ......... 106/197; 260/231 A, 232

[56] References Cited
UNITED STATES PATENTS

| | | | |
|---|---|---|---|
| 2,839,419 | 6/1958 | Windover | 260/231 A |
| 3,709,876 | 1/1973 | Glomski | 260/231 A |

Primary Examiner—Theodore Morris
Attorney, Agent, or Firm—Toren & McGeady

[57] ABSTRACT

A multi-purpose membranous material having high flexibility and mechanical strength, being non-absorbable by other materials in contact therewith, capable of holding aqueous liquids during use and to dissolve in water when disposed of after use, said membranous material being formed at least in part of a member of the group consisting of alkylhydroxy cellulose, natural rubber latex, synthetic rubber latex, polyethylene, oxide, and mixtures thereof. The membranous material may be used as film either by itself or pasted to various bases, as sizing for paper or cloth. Specific applications for the material include hygienic or sanitary articles, baby's wear, disposable diapers or inserts therefor, and many others. The material may also be used for making carrying bags for said articles which may be disposed of together with the articles by throwing them into a toilet bowl.

6 Claims, No Drawings

MULTI-PURPOSE MEMBRANE

CROSS REFERENCE TO RELATED APPLICATION

This is a continuation of application Ser. No. 98,207, filed Dec. 14, 1970 and now abandoned.

DETAILED DESCRIPTION OF THE INVENTION

This invention relates to membranous sheet or film articles that can be put to many uses; the membranes are suitable as materials for a number of disposable articles e.g., of feminine hygiene and sanitary purposes, also for baby's wear, diapers, or inserts therefor; moreover for condoms and the like. They may also be used for bags and kits serving to wrap these articles.

Membranous materials of this kind are generally made from polyvinyl alcohol, and are known to possess such desirable properties that will make the bags leakproof during actual use and causing the articles to dissolve in water when disposed of after use.

On the demerit side, such polyvinyl-alcohol membranes are subject to aging: the plasticizer in the polyvinyl alcohol evaporates gradually; and it is also inherently liable to be absorbed by other substances and passes by absorption into adjacent matters, such as sanitary napkins; and the membranes themselves turn rigid and stiff after a time. Bags made of such membranes and containing hygienic articles will make an undesirable tearing sound when one rips the bag open to take out the contents. Where such a bag is used as a leakproof, tight container for hygienic articles, the contained articles will lose softness and develop an unpleasant touch to the skin, and the tearing noise will annoy or irritate the user.

It is an object of the present invention to provide membranous materials free from the drawbacks of, but retaining the desirable properties possessed by the conventional membranous materials hitherto known.

More particularly, it is an object of the invention to provide a membrane which, as a material for hygienic articles and wrapping bags, is strong and leak-proof, capable of containing a liquid and which, when disposed of after use, can dissolve in water.

It is a further object to provide membranes which do not possess such serious drawbacks as loss of softness due to aging and undesirable tearing sound.

Other objects and advantages of the invention will become apparent from the following detailed description.

In order to achieve the objects of the invention, we use a substance or a combination of substances which are capable of yielding a material having the desired properties.

One basic material used forms an ingredient which provides flexibility to the membrane. At the same time the compound used must impart softness to the article made with the membrane, which goes hand in hand with the suppression of any noise when tearing the material. The ingredient having the mentioned properties is a high-molecular polymer, which in its solid state will not disperse and is not likely to be absorbed by materials lying in contact therewith, such as cotton, synthetic fibers or the like.

In our experiments we found a number of compounds which qualify for making the membranous materials of the invention. One of them is a group of etherified derivatives of cellulose, including methyl-hydroxyethyl cellulose; another group comprises ordinary natural rubber latex and synthetic rubber latex, and similar substances, the term "synthetic rubber latex" including a variety of latexes such as hydrocarbon rubber latex, low-mol polyethylene latex, acrylic ester emulsion, vinylacetate emulsion, and the like, each of these latexes having strong affinity to methylhydroxyethylcellulose and each forming soft liquid-tight film which is soluble or dispersible in water — as explained more fully hereafter; and polyethylene being another such compound in addition to the natural and synthetic latexes specially listed above. Any one or more of these compounds may be employed alone or in combination with others.

Methylhydroxyethyl cellulose will be considered first. In this category, we mention methylhydroxyethyl cellulose having a slight affinity to organic solvents. Ether derivatives of such hexose polymers as starch, mannan, and the like, which are high-polymer carbohydrates and have chemical structures similar to that of methylhydroxyethyl-cellulose, are also in the same category. Because of the structural similarity, these may be considered to have characteristics similar to those of the above-mentioned methyl- and ethyl-hydroxethyl celluloses.

The chemical formula common to all these is:

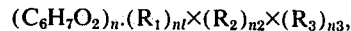

$$(C_6H_7O_2)_n \cdot (R_1)_{n1} \times (R_2)_{n2} \times (R_3)_{n3},$$

where $n$ is a number indicating the degree of polymerization and is defined by the equation $3n$ equals $n_1$ +(plus) $n_2 + n_3$; $R_1$ stands for the hydroxyl-ethoxyl radical (having affinity to water), and $R_2$ for the methoxyl radical or ethoxyl radicals (both having affinity to organic solvents, but not to water), and $R_3$ for the hydroxy radical (having affinity to water), the number of ethoxyl radicals in $R_1$ being one or two; for example, 3,000 NS (a brand name for a methylhydroxyethylcellulose of high polymerization, having a viscosity of C.P.S. 2,700 – 3,000 — 2% water solution at 20° Centigrade), of substitution for $R_1$ and $R_2$ 1.7 – 2.0 and 0.25 – 0.3, respectively, in that order. These high-polymer substances provide increasingly better results in the ascending order of their degrees of polymerization.

The preferred compound is methylhydroxyethyl cellulose (for example, the compound designated 3,000 NS (made preferably by the Toyo Kasei Company, Japan) or any of similar products of that company with a high degree of polymerization, or its equivalent. The molecular structure of methylhydroxyethyl-cellulose is built on a straight chain to which branch chains are formed with radical: $-CH$, $-OCH_3$, $-O(O_2H_4)_nOH$. The co-existence of hydrophilic and oleophilic radicals in the structure accounts for the presence of a large non-crystalline portion in its gel. This is the reason why the gel of this compound is soft and noiseless.

The non-crystalline portion readily takes in water molecules, so that the gel can be easily macerated or soaked with water. Since maceration does not weaken its tissue structure, it may be said capable of holding aqueous liquid. The water absorbing ability of this compound is very high and varies with relative humidity. It can absorb water up to 4% to 35% relative humidity; 10% at 57% R.H.; 15% at 65% R.H.; 35% at 90% R.H.; 40% at 95% R.H. This ability is illustrated in the example we have indicated.

Methylhydroxyethylcellulose is miscible with other water-soluble substances, mixes even with non-soluble substances if they are in emulsified state, and forms a continuous gel by so mixing. The gel formed with an emulsified non-soluble substance is readily soluble in water when its non-soluble resin content is small. As the resin content increases, it turns less soluble in water but dispersible in water and finally becomes liquid-tight.

Addition of chemicals to the mixture develops distinct characteristics. We have shown resultant characteristics for various chemical additives in the specification. It should be noted that the art of producing such membranes as are introduced by the present invention by adding proper doses of chemicals had not been known prior to it.

As mentioned before, with any of the chemicals indicated above, another chemical may be combined "whose kind some times should be determined on the basis of the properties required of the membrane, and it must be one that will enhance in the membrane softness and capability of noiseless tearing, without sacrificing its physical strength, or, where the membrane is required to be leak-proof, capable of improving its ability to hold aqueous liquids and yet make it practically dissolvable in water. One chemical to be combined, as necessary, with such a substrate may be the N–18 — a brand name product of Nippon Synthetic Chemical Industries Company, being a polyvinyl alcohol of relatively high polymerization. The degree of polymerization is about 1,800; the viscosity is about C.P.S. 27.5 — 2% water solution at 20° Centigrade. It does not dissolve in water at room temperature, but begins to dissolve at about 80° Centigrade. The degree of saponification is high and ranges from about 99% to 100%. Water solubility is relatively low. It readily forms comparatively soft film. Other compounds are dextrin, and hydroxypropyl starch.

In the membrane according to this invention, formed with the use of such an additive, softness and noiseless tearing are proportional in degree to each other. These properties are particularly desirable where the membrane is to be used to line or face sheets of soft paper.

Membranous articles made of the subject material are permanently pliable and soft. They do not make crunchy noise when crumpled. We mean such crunchy noise as you would hear when handling sheets of polyvinyl alcohol.

Polyvinyl alcohol sheets, if used as water-repellent tissues in sanitary napkins or as wrapping sheets for such napkins, crunchy noise would issue forth when the user handles the napkin. Such noise is generally abhored by woman folks for fear that noise might announce to others nearby of the menstrual period of some disturbance of physiological nature. Women are generally sensitive to these matters.

The subject material is capable of dispersing in water and yet its tissue structure is tight enough to hold aqueous liquid such as menstrual discharge. These two seemingly contradictory features are what distinguish the subject material from others.

Because of these properties the subject material is well qualified for use in the making of films or sheets required to be soft and noiseless. Other materials for sheet making are natural rubber, polyethylene, polypropylene, polymetacrylic ester, etc. These materials, however, do not break up in water.

Materials that dissolve in water are starchy paste, agar-agar, glue, gelatine, etherized starch, carboxymethylcellulose, polyvinyl alcohol, polyacrylic amide, etc. These materials have oxygen or nitrogen atoms in their molecular structures: oxygen and nitrogen atoms bond with hydrogen atoms to result in gels, and the gels so formed are hard and crunchy.

A material capable of being formed into membranes and possessing the above-mentioned two properties under the temperature and humidity conditions expected to be normally encountered had not been available until the subject invention was successfully reduced to practice.

The present invention first took up methylhydroxyethylcellulose as such a substance. This cellulose compound is a cellulose ether. Because cellulose ethers in general are soluble in water, methylhydroxyethyl cellulose was logically predicted to be capable of take membranous forms and, in such forms, remain soluble in water. It has many more properties than just these two and, with all its properties, was found particularly suitable for use in the manufacture of such as feminine hygienic articles, condoms and wrappings for these articles. It was the present invention by which the utility of methylhydroxyethylcellulose was for the first time revealed in this area of application.

The chemical with such flexibility and softness is a high-polymer substance of such a nature that, in its solid state, it does not disperse nor evaporate to be absorbed by matters coming in contact with it, such as cotton, synthetic fibers, natural fibers, etc.

According to this invention, a membrane made with a compound of high polymerization, less soluble in water, with or without a chemical additive, is not inferior in liquid-proofness and is soft as compared to a membrane made with a substance of low grade of polymerization with good solubility.

If to a substance, of low grade of polymerization, a small amount of mechanically strong high-polymer substance less soluble in water, such as, for instance, methylhydroxyethyl cellulose with a saponification value of 99 – 100% is added, which does not dissolve in cold water, the mechanical strength of the membrane is increased even when it is soaked with moisture, to improve its liquid holding ability, to give to it a necessary degree of softness, and to make it practically dissolvable in water. By "practically dissolving in water" we mean a behavior exhibited by an article made from the mixture of a soluble additive and a less soluble substance as the substrate mentioned, whereby the membrane when exposed to water becomes macerated and, loses its mechanical strength so that it breaks up in water and the article disappears as if it were soluble.

It was experimentally confirmed that, if polyvinyl alcohol is used as the additive which is relatively low in saponification value and more soluble in water, the resultant membrane is undesirably hard. It was also found that the use of a highly polymerized substance soft but less soluble and conducive to film formation, such as natural latex, results in a membrane which is flexible, liquid-tight, sufficiently strong and capable of practically dissolving in water.

A membrane using natural rubber latex as basic ingredient decomposes in water by the action of bacteria and so may be said to be "soluble in water," in a broader sense of the word "soluble." However, the solubility (or dispersing property) contemplated here is not predicated on such bacteria-induced decomposition, but refers to the ability of the membrane to break up or dissolve in water because of its affinity to water.

It should be noted that for obtaining best results, basic ingredient and additive should be appropriately selected. Thus, methylhydroxyethyl cellulose to which a high-polymer substance, whose structure is similar to that of the cellulose derivative, such as dextrin (made by roasting starch) has been added, results in a membrane relatively flexible and possessing the desirable properties mentioned already. For this methylhydroxyethyl cellulose of a less soluble, highly polymerized kind is preferable.

If the additive is not soft and is seemingly poor in the ability to dissolve together with methylhydroxyethyl cellulose, the resultant membrane is likely to be less flexible.

Substances like polyethylene oxide are water-soluble high polymers, soft, liquid-tight and having no affinity to other substances. They are suitable for use as the basic ingredient. The flexibility of the membrane made with polyethylene oxide can, for instance, be augmented by adding thereto a compound as glycerine or any of polyhydric alcohols ranging from glycerol to hexitol, a product called SUTRU (a Kao Atlas Company product). This name "SUTRU" is a brand name of a product produced from saccharose by hydrogenation. Hydrogenation breaks up the saccharose molecules, reducing the average molecular weight to about 160. The product of hydrogenation is mainly triose or a mixture ranging from triose to hexose, quantitively peaking with pentose. SUTRU is high soluble in water, exists in paste form even in summer, and dissolves into methylhydroxy-ethyl-cellulose and other water soluble high polymers. It is capable of actions similar to those of plasticizers.

The additive chemical to be used according to this invention is not limited to those mentioned above, but may be any combination of two or more appropriate chemicals that will produce the properties desired of the membrane. During the process of forming the membrane, some further additives, such as a releasing agent for making the membrane easier to peel off, may be used without altering the spirit of this invention.

The degree of liquid tightness is the higher, the lesser the prevalence of pinholes in the membrane, the greater the homogeneity of the membrane and the lower the solubility of the additive chemical. Where liquid tightness is concerned, a soft membrane should be thick, while a hard membrane may be thin. Speaking generally, a desired degree of liquid tightness can be obtained by properly varying the proportions of the substrate and additive and the membrane thickness.

Sometimes it is desirable to use a mixture of the compounds which were indicated above as being suited to form the substrate or basic ingredient.

Natural rubber latex will be considered as an example. This latex takes the shape of film when it solidifies by drying. The film is not soluble in water. When a membrane is made by adding methylhydroxyethyl cellulose to the film, it does not seep into adjacent substances, is practically soluble in water, stays flexible and liquid-tight, and possesses sufficient mechanical strength. The mixture of this kind can be worked into membranes by adding other substances, and therefore it may be regarded as qualifying as a substrate.

In an actual working of this invention, we prepared specimens by letting an aqueous solution, with 3 to 6 grams of solid of one of the compounds described above, with or without additives, to 100 grams of water, flow over the surface of an iron plate treated with a teflon solution and allowing the plate to stand still in an atmosphere of 85°C to 90°C to dry the solution into a film until the water content decreased to about 34%; this was done in order to avoid overheating in the subsequent drying step. Thereupon, we dried the film on the plate for several hours in calm air at low temperatures of 50°C to 55°C under a reduced pressure of a 2mm mercury column. The temperature was then lowered to normal and the drying process was continued for half a day under the same reduced pressure to make the film practically free of water. We placed each specimen so prepared in a weighing bottle, and placed the bottle in a dessicator kept at room temperature (about 23° C), using phosphorous pentoxide as the dessicant. We designated this specimen as "A."

A plurality of specimens were prepared in the same manner as designated as "B," "C" and "D," as follows: Specimen "B," kept in a phosphorous-pentoxide dessicator, was left standing for half a day in a refrigerator held at −5°C; specimen "C," kept in a sulfuric-acid dessicator with a relative humidity about 2% at 2°C, was left standing in a refrigerator held between 2°C and 4°C, with the specimen exposed to said relative humidity; specimen "D," kept in a constant-temperature sulfuric-acid dessicator held at 40°C, was left in an atmosphere of 30% relative humidity for the prevailing temperature. The conditions under which the specimens were placed will be designated as A, B, C and D.

In order to bring the specimens to the respective states suitable for their applications, specimens "A" and "B" were left standing for some time ranging from several hours to some tens of hours, and specimens "C" and "D" for about 3 days, under the respective conditions designated above.

Specimens C and D were tested under the designated conditions C and D for their flexibility and their tearing-sound under stringent environmental conditions of temperature and humidity, to which the membrane articles may be subjected. Specimens "A" and "B" were tested under the conditions A (normal temperature) and B (low temperature), respectively, for their properties in the actual dessicated state. The characteristics determined by testing specimens "A," "B," "C" and "D" for a total of 6 examples of this invention will be explained below.

In the experimental working of this invention, from which the following results were obtained, the substances used were as follows:

NH–18: Not soluble in water at normal temperatures, soluble at temperatures of 80° Centigrade and over 99 – 100 percent (mol %) saponification value, C.P.S. viscosity of 27.5 (2%, 20° Centigrade), Nippon Synthetic Co. product.

Roasted (baked) dextrin: AKADAMA dextrin, Nichiden Chemical Co. product, produced from potato by heating and dissolving it into water.

Hydroxypropyl starch (Pio-starch): PAIOSTAKI, a Nichiden Chemical Co. product, obtained from potato starch by turning it into hydroxypropyl ether with the use of propylene oxide. The degree of displacement in the process ranges from 0.05 to 0.10, the remaining 2.95 to 2.9 being hydroxy radical. It melts at 52° to 56° Centigrade, forms strong transparent film, and dissolves radily into latex, polyvinyl alcohol, and the like.

Natural rubber latex: ordinary enriched natural rubber latex, enriched to about a 60% solid latex, with a pH value brought to about 9 to 10 by addition of ammonia, stabilized with aqueous latex.

Methylhydroxyethyl cellulose: 3,000 NS (described already above).

G-30: This is a brand name for a product, a methyl-hydroxyethyl-cellulose of low polymerization, of viscosity C.P.S. 20 – 40 (2% water solution/20° Centigrade); substitution degrees of 0.25 – 0.30 for both methylations and 1.7 – 2.0 for hydroxylation, Toyo Kasei Co. product.

SUTRU: SUTRU 100, Polyhydric alcohols from glycerol to hexitol, Kao Atlas Co. product.

The specimens were tested for flexibility and sound by bending and folding the specimen film rapidly with finger tips capped with cloth sacks. For solubility, the specimen was immersed in water at normal temperature (about 25°C) and then stirred in water. To determine the liquid tightness of the specimen, the test method prescribed by the faminine hygiene article standard, No. 285, of the Welfare Ministry of Japan (Kosei Sho), was applied to the specimens which had been dried in air. This standard is based on the use of 10 cc of 0.2% congored solution to be given to the specimen and a 1-kg weight of 50 mm in diameter, and requires the specimen under test to remain liquid-tight for at least 3 minutes in pressurized condition, whereas a higher pressure with a 10-kg weight was applied in testing the specimens of each of the following examples.

The specimen films were composed of 100% basic ingredient, namely, 3,000 NS methylhydroxyethyl cellulose. The test results were as shown in Table 1.

X-ray photographs made from these specimens show a very large area belonging to the dispersed lower part, corresponding to the refraction from the amorphous portion. This image suggests a high degree of non-crystallization in the specimen. From the X-ray pictures, it may be inferred that the structure is soft enough to produce little sound when bent, or no sound at all in some applications, and that, if the film has affinity to water, it will readily dissolve in water. These inferences were corroborated by the results of subsequent experiments.

Film specimens made with the same 3,000 NS in the same manner as the above specimens were tested as follows: They were inserted into the absorbent material used in feminine hygiene articles, and subjected to a pressure of 1 kg/cm$^2$ in the inserted state for 7 days under condition D; then the specimens were examined and noted to be flexible, not to produce sound on tearing, and without any evidence of aging; then the specimens were heat-treated (at 90°C for 5 hours, for instance), resulting in no change in softness, but making them readily soluble in soft water.

Thus, the film of Example 1 can be used as the material for condoms by heat-treating it in the above or similar manner to make it readily soluble in soft water.

Example 2

The specimens were composed of 60% 3,000 NS substrate and 40% roasted dextrin. The test results were as shown in Table 2:

Table 2

| Specimen | Thickness m/μ | Flexibility | Sound | Solubility | Liquid tightness |
|---|---|---|---|---|---|
| A | 30 – 60 | Soft but harder than Example 1 | None | Better than Example 1 | Good |
| B | do. | Nearly as soft as Example 1 | do. | do. | do. |
| C | do. | Not so soft as Example 1 | do. | do. | do. |
| D | do. | do. | do. | do. | do. |

Example 3

The specimens were composed of 70% 3,000 NS substrate and 30% hydroxypropyl starch. The test results were as shown in Table 3:

Table 3

| Specimen | Thickness m/μ | Flexibility | Sound | Solubility | Liquid tightness |
|---|---|---|---|---|---|
| A | 30 – 60 | Slightly hard | Practically none | Good | Good |
| B | do. | do. | do. | do. | do. |
| C | do. | do. | do. | do. | do. |
| D | do. | do. | Small | do. | do. |

Table 1

| Specimen | Thickness m/μ | Flexibility | Sound | Solubility | Liquid tightness |
|---|---|---|---|---|---|
| A | 60 – 90 | Good | None | Macerates and dissolves completely | Good |
| B | do. | do. | do. | | do. |
| C | do. | do. | do. | | do. |
| D | do. | do. | do. | | do. |

Example 4

Natural rubber latex was enriched to a 60% solid concentration, to which ammonia was added to bring its pH value to 9 – 10, and which was then mixed with an aqueous solution of 3,000 NS to produce a solution of 4 – 6 grams/100 grams concentration. The film specimens were made with this solution. The test results were as follows:

Table 4

A (Proportions: 20% natural rubber latex 80% 3,000 NS)

| Specimen | Thickness m/μ | Flexibility | Sound | Solubility | Liquid tightness |
|---|---|---|---|---|---|
| A | 36 – 51 | Soft | None | Readily disperses | Good |
| B | do. | do. | do. | do. | do. |
| C | do. | do. | do. | do. | do. |
| D | do. | do. | do. | do. | do. |

B (Proportions: 40% natural rubber latex, 60% 3,000 NS)

| Specimen | Thickness m/μ | Flexibility | Sound | Solubility | Liquid tightness |
|---|---|---|---|---|---|
| A | 36 – 51 | Soft | None | Readily disperses into pieces | Good |
| B2 do. | do. | do. | do. | do. | |
| C | do. | do. | do. | do. | do. |
| D | do. | do. | do. | do. | do. |

Example 5

3,000 NS as the substrate and NH–18 were mixed in the ratio of 60% to 40%, in that order. The test results obtained on the specimens made with this mixture were as follows:

Table 5

| Specimen | Thickness m/μ | Flexibility | Sound | Solubility | Liquid tightness |
|---|---|---|---|---|---|
| A | 30 – 60 | Slightly harder than Example 1 | Practically none | Fair | Good |
| B | do. | do. | do. | do. | do. |
| C | do. | do. | do. | do. | do. |
| D | do. | do. | do. | do. | do. |

The flexibility and solubility of the specimens of Example 5 were, as in the case of Example 3, almost negligibly "harder" and "less than good," respectively.

Example 6

The specimens were prepared with a water solution of 3% 3,000 NS, which was applied by pasting to sheets of crepe paper to form a sizing of a 28 grams/² size, the paper was then dried in the pasted condition. The specimens of the treated paper gave the following test results:

Table 6

| Specimen | Amount of size (grams/m²) | Flexibility | Sound | Dispersibility |
|---|---|---|---|---|
| A | 35 | Slightly hard | A little | Good |
| B | do. | do. | do. | do. |
| C | do. | Good | None | do. |
| D | do. | do. | do. | do. |

In Table 6, the flexibility termed "slightly hard" was actually negligibly hard and not short of "good."

The membrane according to this invention may be used as film or as a material to be directly applied or, in the form of film or similar shape, be pasted to various bases, such as paper, unwoven cloth and the like; or it may be used as a leak-proofing sizing material for paper, unwoven cloth and the like.

Specific applications for the membrane of this invention include hygienic articles, baby's panties or diapers and similar articles, in which the membrane can serve as a leak-proof membranous component strong enough to contain liquids.

As a material for condoms, the membrane of this invention possesses strength high enough to preserve the shape during a storage as well as use, retains good tactile quality, and provides a completely new manner of disposal in that it may be thrown into a toilet bowl after use for it completely loses it shape by dissolving in water.

Another application is for wrapping bags required to be soft in texture and perfectly free from an undesirable sound upon tearing, such as bags used for containing sanitary or hygienic articles. A bag made with the membrane of this invention may be disposed, together with the articles that have been used, by throwing them into the toilet bowl without any fear of clogging the sewer pipe. Moreover, said membrane is of a high-polymer substance, so that it is impervious to air, and this property gives to the bag an additional ability to keep off bacterial and thus protect the contents against bacterial contamination.

What is claimed is:

1. A multi-purpose membranous material having high flexibility and mechanical strength, being non-absorbable by other materials in contact therewith, capable of holding body fluids during use and readily dispersing when disposed of in water after use, said membranous material being formed at least in part of a hydroxyalkylated cellulose selected from the group consisting of compounds of the formula:

$$(C_6H_7O_2)_n \cdot (R_1)_{n1} \times (R_2)_{n2} \times (R_3)_{n3},$$

where $n$ is a number indicating the degree of polymerization and is defined by the equation $3_n = n_1 + n_2 + n_3$; $R_1$ is the hydroxylethoxyl radical which has an affinity for water, $R_2$ is the methoxyl radical which has an affinity for organic solvents, but not for water, and $R_3$ for the hydroxy radical which has an affinity for water, the number of ethoxyl radicals in $R_1$ being one or two, and the degrees of substitution for $R_1$ and $R_2$ being 1.7–2.0 and 0.25–0.3, respectively.

2. A composition consisting essentially of fibers and the material of claim 1.

3. The membranous material according to claim 1, comprising further an additive selected from the group consisting of: polyols from glycerol to hexitol; dextrin; and hydroxypropyl starch.

4. The membranous material according to claim 1, consisting of about 100% methylhydroxyethyl cellulose of high polymerization, having a C.P.S. viscosity ranging from about 2,700 to about 3,000, 2%/water at 20° Centigrade.

5. The membranous material according to claim 1, consisting of about 60% by weight of methylhydroxyethyl cellulose of high polymerization having a C.P.S. viscosity ranging from about 2,700 to about 3,000, 2%/water at 20° Centigrade, and about 40% by weight roasted dextrin.

6. The membranous material according to claim 1, consisting of about 70% by weight of methylhydroxyethyl cellulose of high polymerization having a C.P.S. viscosity ranging from about 2,700 to about 3,000, 2%/water at 20° Centigrade, and about 30% of hydroxypropyl starch.

* * * * *

UNITED STATES PATENT OFFICE
CERTIFICATE OF CORRECTION

Patent No. 3,850,652　　　　　　　　Dated November 26, 1974

Inventor(s) KUNITAMI ASAKA et al

It is certified that error appears in the above-identified patent and that said Letters Patent are hereby corrected as shown below:

In the heading of the patent, insert:

--[30] Foreign Application Priority Data

July 3, 1969　JAPAN................44/52379--

Signed and sealed this 4th day of February 1975.

(SEAL)
Attest:

McCOY M. GIBSON JR.　　　　　　　C. MARSHALL DANN
Attesting Officer　　　　　　　　Commissioner of Patents